United States Patent
Dapore et al.

(10) Patent No.: US 8,787,498 B2
(45) Date of Patent: Jul. 22, 2014

(54) SYSTEMS AND METHODS FOR ENHANCED CARRIER SUPPRESSION

(75) Inventors: Mark Dapore, Mason, OH (US); Robert Hayes, Villa Hills, KY (US); Greg Rupp, Mason, OH (US)

(73) Assignee: L-3 Communications Cincinnati Electronics Corporation, Mason, OH (US)

( * ) Notice: Subject to any disclaimer, the term of this patent is extended or adjusted under 35 U.S.C. 154(b) by 330 days.

(21) Appl. No.: 13/212,691

(22) Filed: Aug. 18, 2011

(65) Prior Publication Data

US 2013/0044829 A1 Feb. 21, 2013

(51) Int. Cl.
*H04L 27/20* (2006.01)

(52) U.S. Cl.
USPC .......................................... 375/308

(58) Field of Classification Search
CPC .......... H04L 27/00; H04L 27/04; H04L 27/20
USPC .......................................... 375/259, 295, 308
See application file for complete search history.

(56) References Cited

U.S. PATENT DOCUMENTS

| | | | |
|---|---|---|---|
| 3,838,350 A | 9/1974 | Ewanus et al. | |
| 4,726,039 A | 2/1988 | Piesinger | |
| 5,382,924 A | 1/1995 | Pardoen et al. | |
| 5,548,253 A | 8/1996 | Durrant | |
| 5,574,994 A | 11/1996 | Huang et al. | |
| 5,696,795 A | 12/1997 | Williams et al. | |
| 6,574,286 B2 | 6/2003 | McVey | |
| 2003/0147472 A1* | 8/2003 | Bach et al. | 375/295 |
| 2006/0208820 A1 | 9/2006 | Parsa et al. | |
| 2008/0075198 A1* | 3/2008 | Chang et al. | 375/308 |
| 2009/0261918 A1 | 10/2009 | Walkington | |
| 2010/0014610 A1* | 1/2010 | Jaso | 375/308 |
| 2010/0102895 A1 | 4/2010 | Beukema et al. | |

* cited by examiner

*Primary Examiner* — Sam K Ahn
*Assistant Examiner* — Shawkat M Ali
(74) *Attorney, Agent, or Firm* — Dinsmore & Shohl LLP

(57) ABSTRACT

Included are embodiments for enhanced carrier suppression. One embodiment of a circuit includes a mixer that receives a cover sequence, the cover sequence including transition data from a first signal and a second signal. The mixer may be configured to generate a modulated cover sequence by modulating a radio frequency (RF) carrier with the cover sequence. Some embodiments also include a modulator that is communicatively coupled to the mixer. The modulator may be configured to receive and modulate an altered version of the first signal and an altered version of the second signal. The modulator may additionally receive the modulated cover sequence as an RF carrier input and generate an RF output by modulating the modulated cover sequence with the altered version of the first signal and the altered version of the second signal.

10 Claims, 5 Drawing Sheets

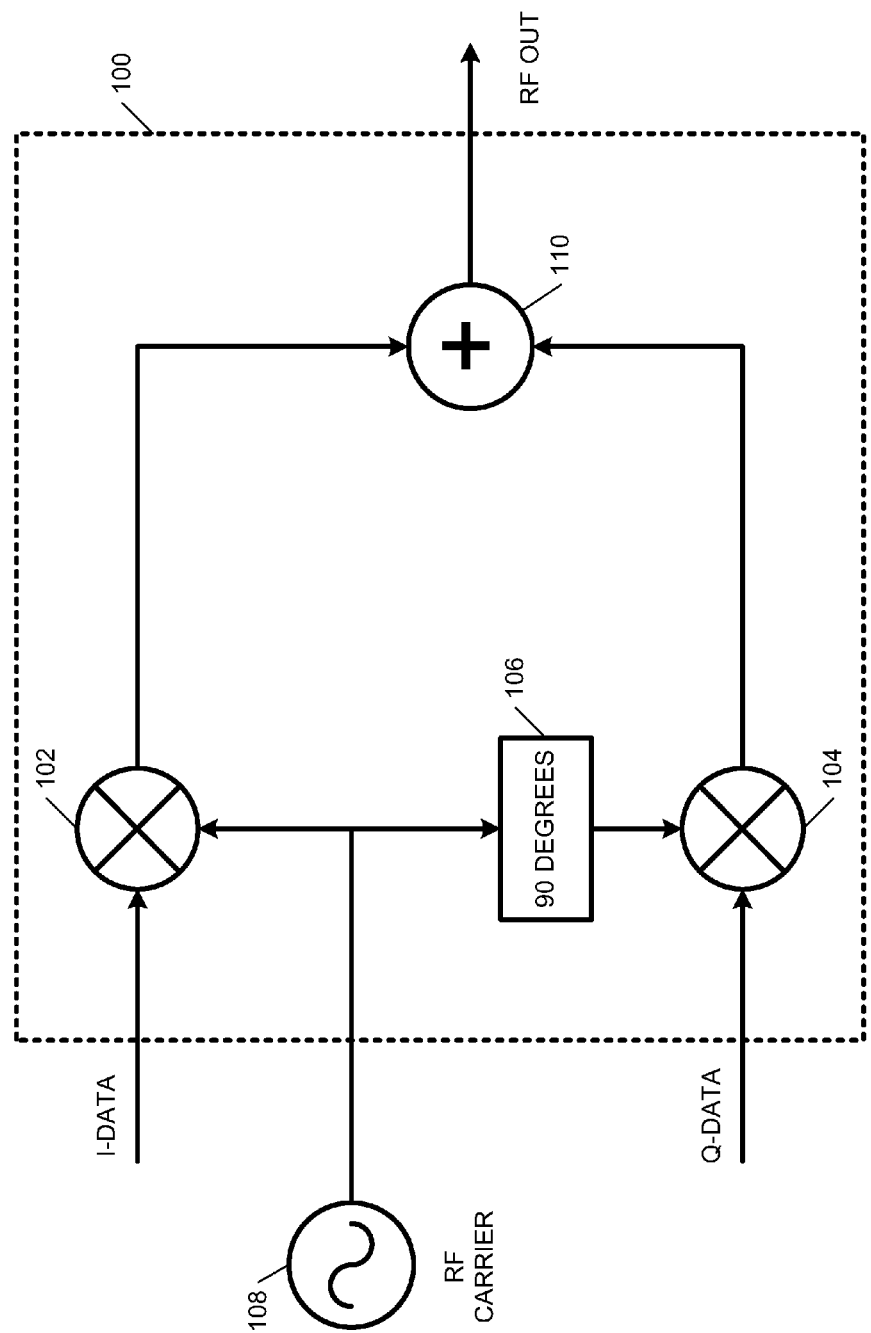

_US 8,787,498 B2_

SYSTEMS AND METHODS FOR ENHANCED CARRIER SUPPRESSION

TECHNICAL FIELD

The present application generally relates to systems and methods for enhanced carrier suppression, and particularly to embodiments for utilizing a mixer and/or a modulator to modulate a carrier signal.

BACKGROUND

Residual carrier occurs when a modulated output contains a residual unmodulated carrier tone. A primary cause of residual carrier is that mixers and modulators, which perform a mathematical multiplication function that results in a frequency transition, will generally have some leakage from a radio signal (RF) path to the output. In other words, a modulator will generally have some fraction of the RF unmodulated carrier that bleeds through to the output. A secondary cause of residual carrier in a quadrature phase shift keying (QPSK) modulator is amplitude imbalance between the in-phase channel (I-channel) and quadrature data channel (Q-channel). Any imbalance in the I-channel or Q-channel may result in some fraction of the unmodulated carrier appearing on the modulator output. Residual carrier is undesirable because it can cause interference with other users when bandwidth is being shared. The transmission of residual carrier may also be a violation of the federal communications commission (FCC) regulations.

SUMMARY

Included are embodiments for enhanced carrier suppression. One embodiment of a circuit includes a mixer that receives a cover sequence, where the cover sequence includes transition data from a first signal and a second signal. The mixer may be configured to generate a modulated cover sequence by modulating a radio frequency (RF) carrier with the cover sequence. Some embodiments also include a modulator that is communicatively coupled to the mixer. The modulator may be configured to receive and modulate an altered version of the first signal and an altered version of the second signal. The modulator may additionally receive the modulated cover sequence as an RF carrier input and generate an RF output by modulating the modulated cover sequence with the altered version of the first signal and the altered version of the second signal.

Also included are embodiments of a system. Embodiments of a system include a digital logic block that receives a current version of a first signal, a delayed version of the first signal, a current version of a second signal, and a delayed version of the second signal. The digital logic block may be configured to generate a cover sequence that includes a subset of transitions from the current version of the first signal and the current version of the second signal. The digital logic block may further generate an altered version of the first signal and an altered version of the second signal that reflect transitions that remain after the subset of transitions have been removed. Also included is a mixer that is communicatively coupled to the digital logic block. The mixer may be configured to receive the cover sequence and generate a modulated cover sequence by modulating a radio frequency (RF) carrier with the cover sequence. The system may additionally include a modulator that is communicatively coupled to the digital logic block. The modulator may be configured to receive the altered version of the first signal and the altered version of the second signal. The modulator may be further configured to receive the modulated cover sequence as an RF carrier input and generate an RF output by modulating the modulated cover sequence with the altered version first the first signal and the altered version of the second signal.

Also included are embodiments of a method. Some embodiments of the method include receiving a plurality of signals, the plurality of signals including a plurality of transitions, generating a cover sequence for the plurality of signals, and removing a subset of transitions from the plurality of signals. Similarly, some embodiments of the method include creating an altered cover sequence by including the subset of transitions with the cover sequence, generating an altered version of the plurality of signals, wherein the altered version of the plurality of signals reflects transitions that remain in the plurality of signals, and creating a modulated cover sequence by modulating the altered cover sequence with a radio frequency (RF) carrier. Still some embodiments include creating an RF output signal by modulating the altered version of the plurality of signals, via utilization of the modulated cover sequence as an RF carrier input.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 1 depicts a circuit diagram illustrating a QPSK modulator, according to embodiments disclosed herein;

DETAILED DESCRIPTION

Figure 2A:
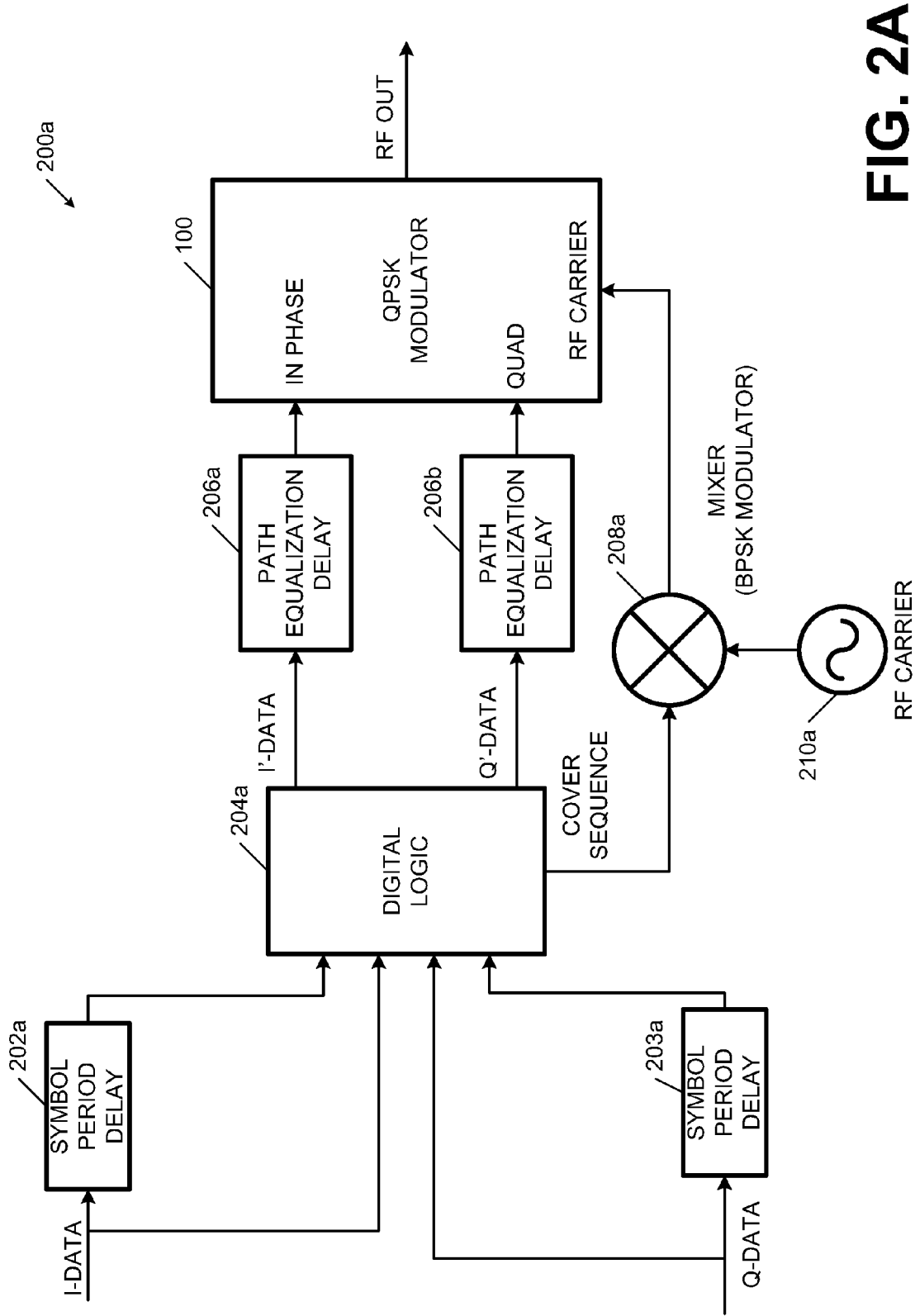
FIGS. 2A, 2B depict circuit diagrams illustrating a carrier suppression system, according to embodiments disclosed herein.

Embodiments described herein generally relate to systems and methods for enhanced carrier suppression. More specifically, embodiments disclosed herein utilize a first modulator, a second modulator, and digital logic. In some embodiments, the digital logic receives input signals and generates a cover sequence with transitions that are removed from the input signals. In addition, modified signals are generated that reflect only the transitions that are not removed from the original input signals. The cover sequence may be derived from transitions that occur substantially simultaneously on two input digital data streams. The digital logic can send the cover sequence to a first modulator and the modified signals to a second modulator. The first modulator may also receive an RF carrier signal, and send a modulated signal as an RF carrier input signal to the second modulator. In this context, an RF carrier signal may include any digital or analog periodic waveform. Such a system exhibits at least about 40 db of residual carrier suppression, and in some embodiments at least about 60 dB of residual carrier suppression. This is significantly higher than current solutions, which generally provide 30 dB-40 dB of residual carrier suppression.

More specifically, assuming that separate data sequences are received on both I-channel and Q-channel data streams, a traditional QPSK modulator generally utilizes the in-phase data signal (I-data) to modulate an RF carrier directly and the quadrature data signal (Q-data) to modulate a 90-degree shifted RF carrier directly. However, embodiments disclosed herein may be configured to generate a cover sequence in which the I-data and Q-data paths are input into the digital logic block that removes certain transitions from the I-data and Q-data and places the removed transitions on the digital cover sequence. The cover sequence is input to a mixer (or first modulator) that also receives an RF carrier signal. The cover sequence may be used to modulate the RF carrier. The output of the mixer is then utilized as the RF carrier input to a QPSK modulator. The altered version of the I-data and Q-data streams that are modified with the removal of transition data (denoted I'-data and Q'-data), are passed as data inputs to the QPSK modulator. The consequence is that the transitions are reinserted at the same point as they were in the I-data and Q-data. Thus, the output of the QPSK modulator is a standard QPSK modulated waveform with enhanced carrier suppression properties achieved through the dual modulation process.

Referring now to the drawings, FIG. 1 depicts a circuit diagram illustrating a QPSK modulator 100, according to embodiments disclosed herein. As illustrated, the QPSK modulator 100 may receive I-channel and Q-channel data streams (denoted as I-data and Q-data) as input signals at a mixer 102 and a mixer 104, which may be embodied as mixers and/or modulators, such as binary phase shift keyed (BPSK) modulators. The mixer 102 can modulate the I-channel signal with an RF carrier signal from an RF carrier signal generator 108 and send the modulated signal to a summer 110. Similarly, the Q-channel signal may be modulated with a 90 degree phase shift of the RF carrier signal. This modulated signal is also sent to the summer 110 for an RF output.

As will be understood, QPSK modulation generally utilizes two data inputs, and each of these data channels may be modulated by a mixer with the RF carrier. This modulation preserves the associated 90 degree phase shift to maintain mathematical orthogonality. After the data channels modulate the carrier, the two modulated channels may be combined as an input into an amplifier stage to gain the signal up for transmission to an antenna.

Similarly, when up-converting a signal from baseband to an RF signal, frequency translation occurs in which the baseband data, with its associated bandwidth is translated in the frequency domain via a mixer or modulator to a frequency at the carrier frequency. If the baseband tone is represented by the function $f(t)=\cos \omega_0 t$ and the carrier frequency is represented by $c(t)=\cos \omega_c t$, then the mathematical function of modulation represents the product of these functions, where the arbitrary constant 2 is inserted for mathematical convenience:

$$2 \cos \omega_0 t \cdot \cos \omega_c t = \cos(\omega_c+\omega_0)t + \cos(\omega_c-\omega_0)t.$$

This equation shows that modulating an information-bearing tone of a single frequency (e.g., $\omega_0$) by a carrier frequency (e.g., $\omega_c$) results in a signal with two frequency components. One of these frequency components is located at the sum of the carrier plus the tone and one is located at the difference between the carrier and tone frequencies. After filtering, the only frequency component that remains is located at $\omega_c+\omega_0$. This represents the effect of modulating a signal onto a carrier, and in this context, this is a BPSK modulation.

Residual carrier may occur when the modulated output contains a pure carrier tone. Referring to the example above, a baseband tone may be represented by the function $f(t)=\cos \omega_0 t$ and a carrier frequency is represented by the function $c(t)=\cos \omega_c t$. In cases where there is residual carrier on the output of the mixer (102, 104), the output signal may be represented as: $\text{Mix}_{out}=\cos(\omega_c+\omega_0)t+\cos(\omega_c-\omega_0)t+\alpha \cos \omega_c t$, where $\alpha$ denotes the scale factor of the residual carrier.

FIG. 2A depicts a circuit diagram illustrating a carrier suppression system 200a, according to embodiments disclosed herein. As illustrated, a symbol period delay 202a, 203a may be introduced into both a first signal and a second signal, represented in FIG. 2A as I-data and the Q-data streams. The symbol period delays may be implemented in any of a plurality of ways. One mechanism for implementing the symbol delay is to digitally induce a single period delay in the data stream by utilizing a shift register. A second mechanism for implementing the symbol delay is to induce a phase shift by using physical signal trace delays. This mechanism for generating a delay may rely on the fact that a fixed printed circuit board (PCB) trace delay may induce a known delay in a digital data sequence at a known rate. Then, both the current version and the delayed version of the I-data and Q-data are input into a digital logic block 204a. The digital logic block 204a may be configured to remove a subset of transitions from the plurality of transitions present on the I-data and Q-data streams and create a cover sequence from the removed transitions. The cover sequence may be generated utilizing any number of mechanisms, such as a linear feedback generation mechanism or other similar process. The cover sequence is then routed from the digital logic block 204a to a mixer 208a which also receives a radio frequency carrier from a signal generator 210a. The mixer 208a then modulates the cover sequence. The digital logic block 204a may also be configured to generate a modified I'-data and Q'-data stream, which reflects transitions that remain after the cover sequence transitions have been removed. The I'-data and Q'-data signals may be subjected to a delay component, such as path equalization delay 206a, 206b and may then be input to the QPSK modulator 100, which accepts the modulated cover sequence that is output from the mixer 208a as an RF carrier input.

The concept behind removing transitions from the I-data and Q-data streams and placing those transitions on the cover sequence may be best demonstrated through a representative example. More specifically, when both the I-data and Q-data are in state A at time index T, and when both the I-data and Q-data flip to state B at time index T+1, this represents a substantially simultaneous 180 degree phase shift in both data streams. A substantially simultaneous 180 degree phase shift in both the I-data and Q-data streams when applied to a QPSK modulator will result in a 180 degree phase shift of the modulated output RF carrier. Similarly, instead of transitioning the I-data and Q-data streams by 180 degrees, the digital logic block 204a can remove the substantially simultaneous transitions from the original I-data and Q-data streams and place those transitions in a cover sequence. Modulating the cover sequence using a mixer or BPSK modulator 208b will also result in a 180 degree phase shift of the modulated output RF carrier.

The carrier suppression property of this design is a result of the RF carrier passing through both the mixer 208a and the QPSK modulator 100, each of which may exhibit approximately 30 dB of carrier suppression, thus allowing the system to exhibit carrier suppression of greater than a single mixer or modulator (greater than about 40 dB) and in some cases, carrier suppression of greater than about 60 dB.

Figure 2B:
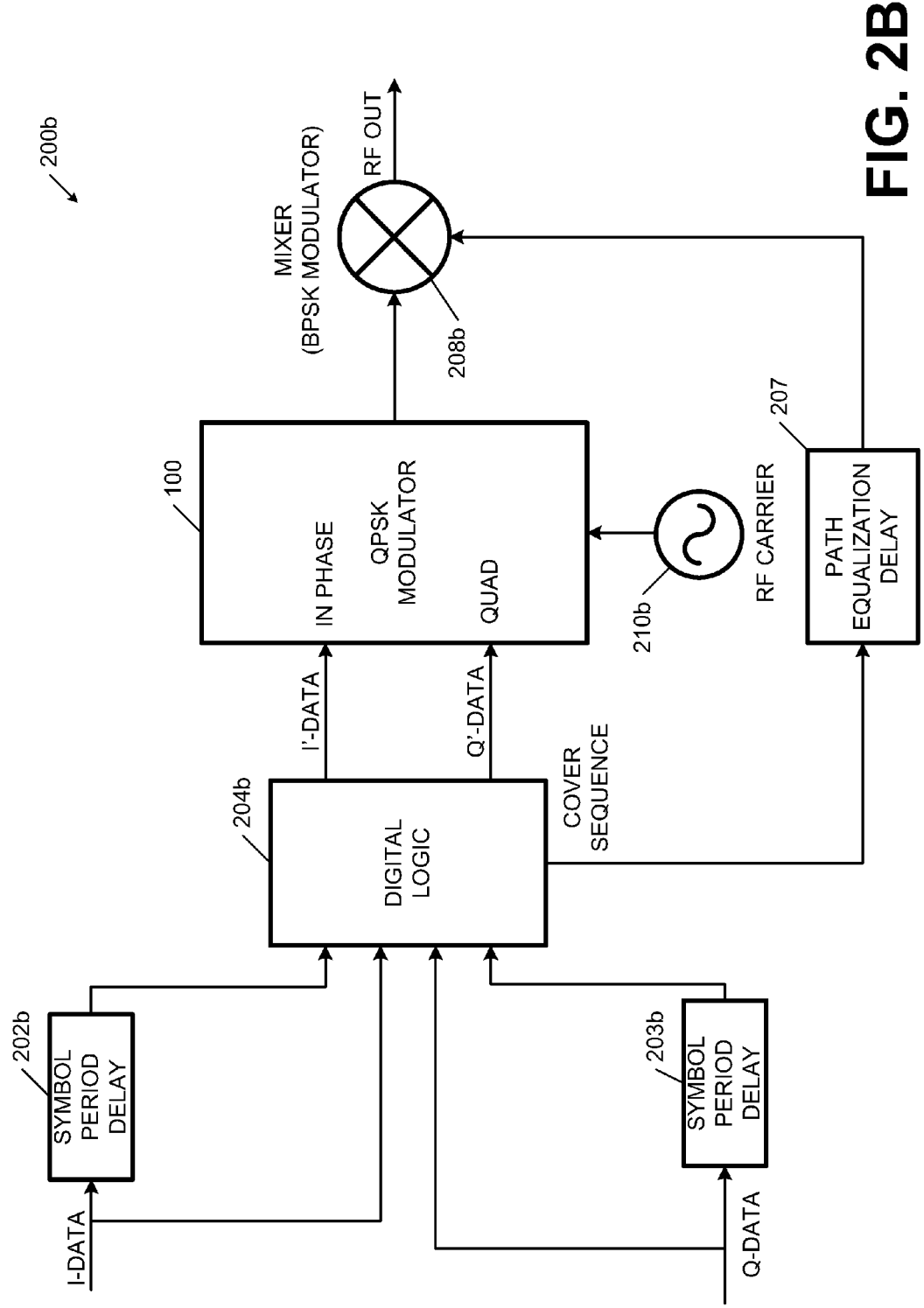

FIG. 2B depicts another carrier suppression system 200b, according to embodiments disclosed herein. As illustrated, a symbol period delay 202b, 203b may be introduced to a first signal (e.g., I-data) and a second signal (e.g., Q-data), similar to FIG. 2A. The first signal, the delayed first signal, the second signal, and the delayed second signal may be sent to a digital logic block 204b. The digital logic block 204b may generate a cover sequence, as well as remove transitions from the input data streams. The digital logic block 204b may also be configured to generate a modified I'-data and Q'-data streams, which reflect transitions that remain after the cover sequence transitions have been removed. The I'-data and Q'-data may be sent to the QPSK modulator 100, which also receives an RF carrier signal from a signal generator 210b. The output from the QPSK modulator 100 may be sent to a mixer 208b (which may be implemented as a BPSK modulator). The mixer 208b may also receive the cover sequence, which has been subject to a path equalization delay 207. The mixer 208b may combine the received signals to generate an output.

It should be understood that similar to the embodiment of FIG. 2A, the embodiment of FIG. 2B may function to effectively insert the removed transitions on the cover sequence at the same point as removed from the I-data and Q-data. Additionally, the embodiment depicted in FIG. 2B may provide the same (or similar) carrier suppression as the embodiment from FIG. 2A.

It should also be understood that while a QPSK modulator 100 is described in FIG. 1 and implemented in FIGS. 2A and 2B, these are merely examples. In some embodiments, higher order modulators may be utilized. In such embodiments, additional delays may be implemented, which scale to the type of modulator being utilized.

Figure 3:
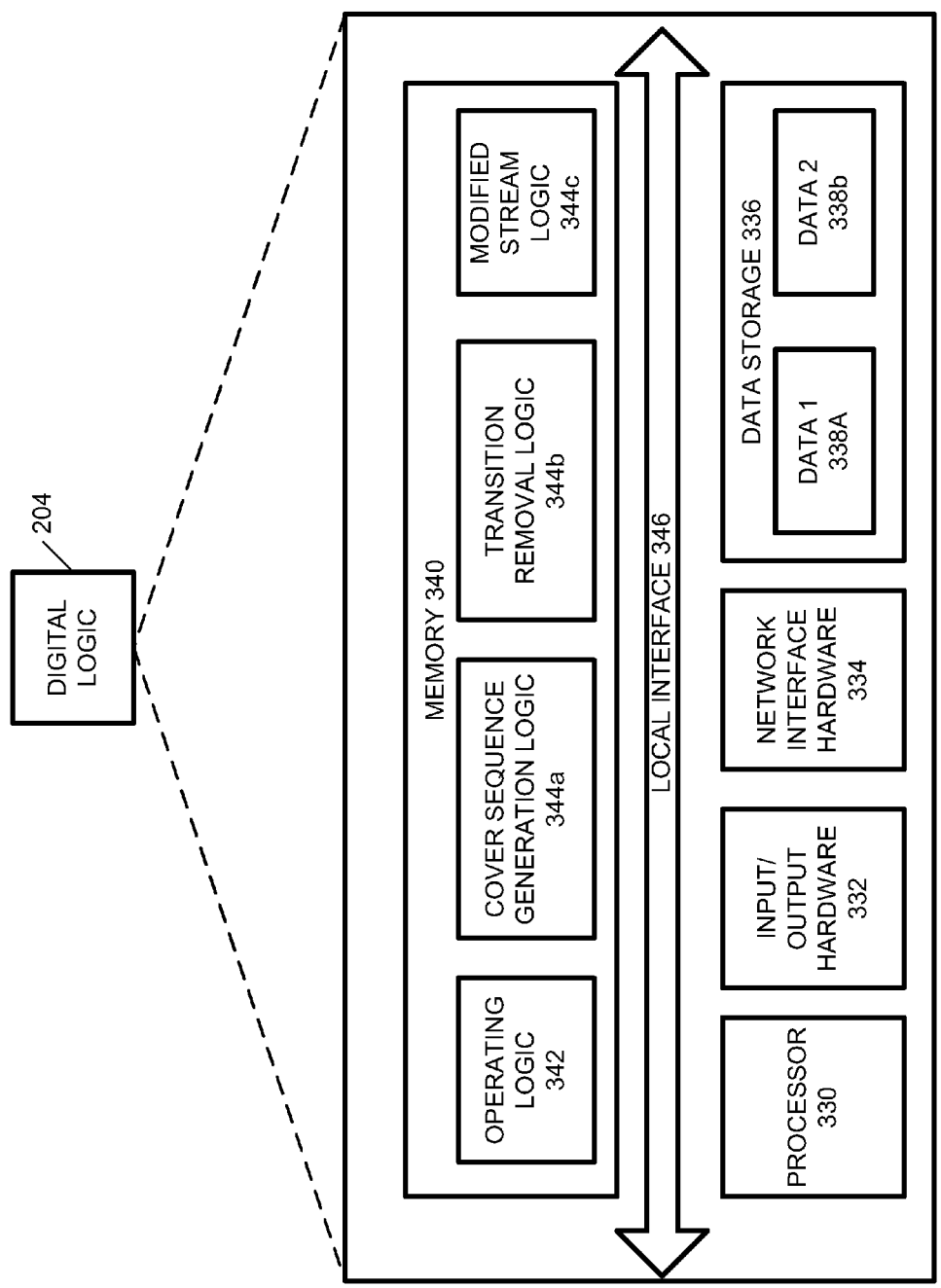
FIG. 3 depicts a block diagram of a digital logic block, according to embodiments disclosed herein.

FIG. 3 depicts a block diagram of a digital logic block 204, according to embodiments disclosed herein. In the illustrated embodiment, the digital logic block 204 (which may be implemented as digital logic block 204a from FIG. 2A and/or digital logic block 204b from FIG. 2B) may be implemented as a plurality of logical hardware gates, one or more integrated circuits, one or more field programmable gate arrays, and/or other hardware, software, and/or firmware. As such, in some embodiments, the digital logic block 204 includes a processor 330, input/output hardware 332, network interface hardware 334, a data storage component 336 (which may store lookup tables and/or other data), and the memory component 340. The memory component 340 is configured as volatile and/or nonvolatile memory and, as such, includes random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the digital logic block 204 and/or external to the digital logic block 204.

Additionally, the memory component 340 is configured to store operating logic 342, cover sequence generation logic 344a, transition removal logic 344b, and modified stream logic 344c. The logic 344a, 344b, and 344c include a plurality of different pieces of logic, and are embodied as a computer program, firmware, and/or hardware. A local interface 346 is also included in FIG. 3 and is implemented as a bus or other interface to facilitate communication among the components of the digital logic block 204.

The processor 330 includes any processing component operable to receive and execute instructions (such as from the data storage component 336 and/or memory component 340).

The input/output hardware 332 includes and/or is configured to interface with a monitor, keyboard, mouse, printer, image capture device, microphone, speaker, gyroscope, compass, and/or other device for receiving, sending, and/or presenting data. The network interface hardware 334 includes and/or may be configured for communicating with any wired or wireless networking hardware, including an antenna, a modem, LAN port, wireless fidelity (Wi-Fi) card, WiMax card, mobile communications hardware, and/or other hardware for communicating with other networks and/or devices. From this connection, communication is facilitated between the digital logic block 204 and other computing devices. Similarly, it should be understood that the data storage component 336 may be configured to store data 338a and/or data 338b and may reside local to and/or remote from the digital logic block 204.

Included in the memory component 340 are the operating logic 342, the cover sequence generation logic 344a, the transition removal logic 344b, and the modified stream logic 344c. The operating logic 242 includes an operating system and/or other logic for managing components of the digital logic block 204. Similarly, as discussed above, the cover sequence generation logic 344a resides in the memory component 340 and is configured to cause the digital logic block 204 to generate a cover sequence. Similarly, the transition removal logic 344b is configured to cause the digital logic block 204 to remove predetermined transitions from the incoming I-data and Q-data streams. The modified stream logic 344c may be configured to cause the other functionality is also included and described in more detail, below.

It should be understood that the components illustrated in FIG. 3 are merely exemplary and are not intended to limit the scope of this disclosure. While the components in FIG. 3 are illustrated as residing within the digital logic block 204, this is merely an example. In some embodiments, one or more of the components may reside external to the digital logic block 204. It should also be understood that, while the digital logic block 204 in FIGS. 1 and 2 is illustrated as a single device, this is also merely an example. In some embodiments, the cover sequence generation functionality, the transition removal functionality, and/or the modified stream functionality may reside on different devices.

Additionally, while the digital logic block 204 is illustrated with the cover sequence generation logic 344a, the transition removal logic 344b, and the modified stream logic 344c, this is also an example. More specifically, in some embodiments, a single piece of logic may perform the described functionality. Similarly, in some embodiments, this functionality is distributed to a plurality of different pieces of logic, which may reside in the digital logic block 204 and/or elsewhere. Additionally, while only three applications are illustrated as being stored by the memory component 340, other applications may also be stored in the memory component 340 and utilized by the digital logic block 204.

It should be understood that while the digital logic block 204 is depicted as a personal computer, this is merely an example. More specifically, the digital logic block 204 may be implemented as one or more logic blocks, a field programmable gate array (FPGA) that operates with a hardware description language, such as VHDL, Verilog, etc. Other combinations of hardware and/or software may be implemented as well.

Figure 4:
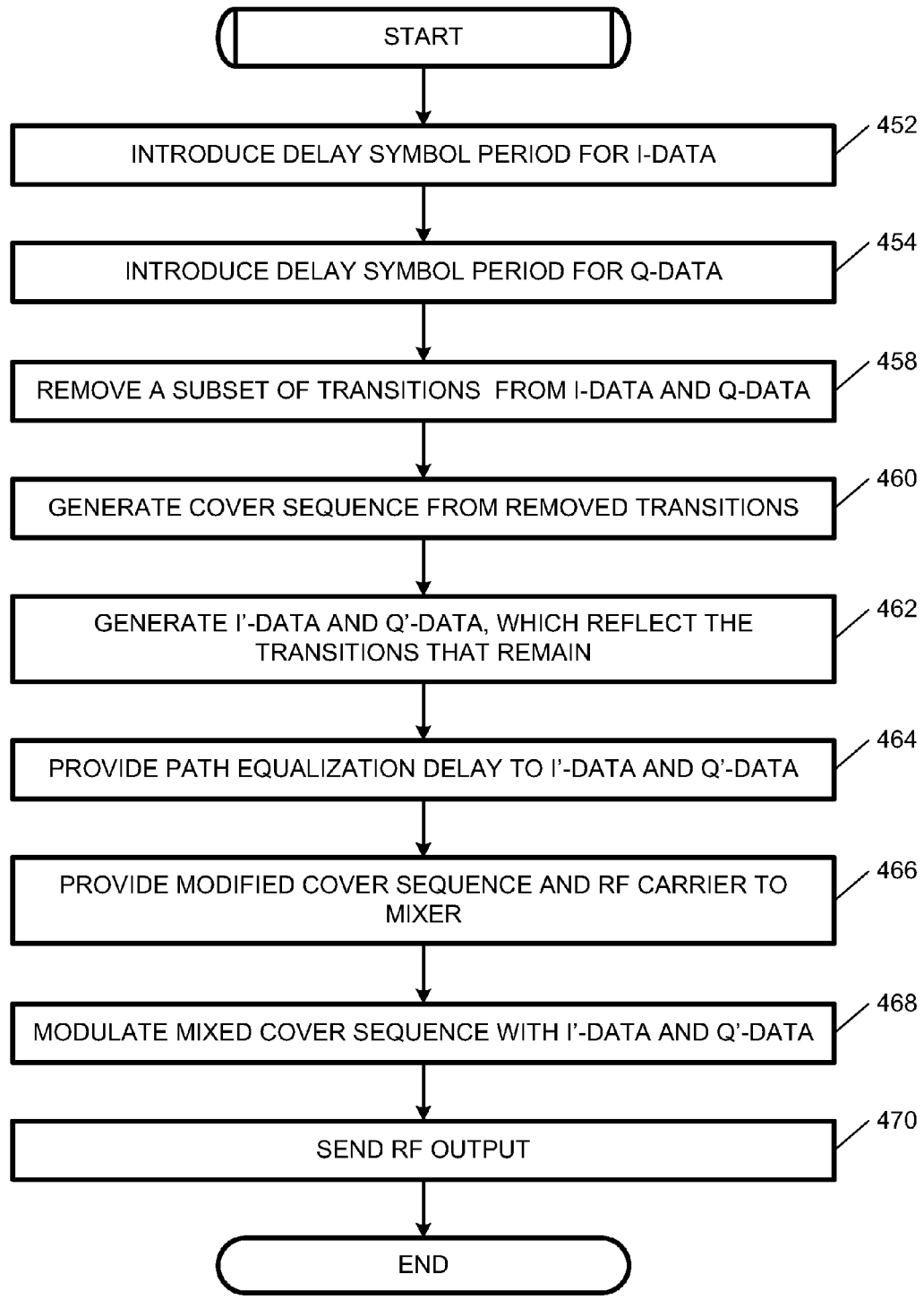
FIG. 4 depicts a flowchart for implementing enhanced carrier suppression, according to embodiments disclosed herein.

FIG. 4 depicts a flowchart for implementing enhanced carrier suppression, according to embodiments disclosed herein. As illustrated in block 452, a delay symbol period may be introduced for the I-data. At block 454, a delay symbol period may also be introduced for the Q-data. At block 458, a subset of transitions may be removed from the I-data and Q-data. At block 460, the cover sequence may be generated from the removed transitions. At block 462, I'-data and Q'-data may be generated, where the I'-data and Q'-data reflect transitions that remain from the I-data and Q-data. At block 464, path equalization delay may be provided to the I'-data and Q'-data. At block 466, the cover sequence and an RF carrier may be provided to a mixer. At block 468, the mixed lower sequence may be modulated with the I'-data and Q'-data. At block 470 an RF output signal may be sent to an amplifier and/or an antenna.

It should be understood that the flowchart included herein shows the architecture, functionality, and operation of a possible implementation of software. In this regard, each block can be interpreted to represent a module, segment, or portion of code, which comprises one or more executable instructions for implementing the specified logical function(s). It should also be understood that in some implementations, the functions noted in the blocks may occur out of the order depicted and/or not at all. For example, two blocks shown in succession may in fact be executed substantially concurrently or the blocks may sometimes be executed in the reverse order, depending upon the particular embodiment.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

Therefore, at least the following is claimed:

1. A system for enhanced carrier suppression, the system comprising: a digital logic block that receives a current version of a first signal, a delayed version of the first signal, a current version of a second signal and a delayed version of the second signal, the digital logic block configured to generate a cover sequence that includes only a subset of transitions from the current version of the first signal and the current version of the second signal, wherein the subset of transitions is less than all transitions from the current version of the first signal and the current version of the second signal, the digital logic block further configured to generate an altered version of the first signal and an altered version of the second signal that reflect transitions that remain after the subset of transitions have been removed; a mixer that is communicatively coupled to the digital logic block, the mixer configured to receive the cover sequence and configured to generate a modulated cover sequence by modulating a radio frequency (RF) carrier with the cover sequence, wherein the mixer includes a binary phase shift keyed (BPSK) modulator; a modulator that is communicatively coupled to the digital logic block, the modulator configured to receive the altered version of the first signal and the altered version of the second signal, the modulator configured to receive the modulated cover sequence as an RF carrier input, the modulator further configured to generate an RF output by modulating the modulated cover sequence with the altered version first the first signal and the altered version of the second signal; and a delay component coupled to the digital logic block and the modulator, the delay component configured to provide path equalization delays to the altered version of the first signal and the altered version of the second signal, wherein the system exhibits 40 dB of carrier suppression.

2. The system of claim 1, wherein the first signal is an in-phase data signal and the second signal is a quadrature data signal.

3. The system of claim 1, wherein the modulator includes a quadrature phase shift keying (QPSK) modulator.

4. A circuit for enhanced carrier suppression, the circuit comprising: a digital logic block that receives a current version of a first signal, a delayed version of the first signal, a current version of a second signal and a delayed version of the second signal, the digital logic block configured to generate a cover sequence that includes only a subset of transitions from the current version of the first signal and the current version of the second signal, wherein the subset of transitions is less than all transitions from the current version of the first signal and the current version of the second signal, the digital logic block further configured to generate an altered version of the first signal and an altered version of the second signal that reflect transitions that remain after the subset of transitions have been removed; a mixer that is communicatively coupled to the digital logic block, the mixer configured to receive the cover sequence and configured to generate a modulated cover sequence by modulating a radio frequency (RF) carrier with the cover sequence, wherein the mixer includes a binary phase shift keyed (BPSK) modulator; a modulator that is communicatively coupled to the digital logic block, the modulator configured to receive the altered version of the first signal and the altered version of the second signal, the modulator configured to receive the modulated cover sequence as an RF carrier input, the modulator further configured to generate an RF output by modulating the modulated cover sequence with the altered version first the first signal and the altered version of the second signal; and a delay component coupled to the digital logic block and the modulator, the delay component configured to provide path equalization delays to the altered version of the first signal and the altered version of the second signal, wherein the circuit exhibits 40 dB of carrier suppression.

5. The circuit of claim 4, wherein the first signal is an in-phase data signal and the second signal is a quadrature data signal.

6. The circuit of claim 4, wherein the modulator includes a quadrature phase shift keying (QPSK) modulator.

7. A method for enhanced carrier suppression, the method comprising: receiving a current version of a first signal, a delayed version of the first signal, a current version of a second signal and a delayed version of the second signal; generating a cover sequence that includes only a subset of transitions from the current version of the first signal and the current version of the second signal, wherein the subset of transitions is less than all transitions from the current version of the first signal and the current version of the second signal; generating an altered version of the first signal and an altered version of the second signal that reflect transitions that remain after the subset of transitions have been removed; receiving, by a binary phase shift keyed (BPSK) modulator, the cover sequence and generating a modulated cover sequence by modulating a radio frequency (RF) carrier with the cover sequence; receiving the altered version of the first signal and the altered version of the second signal; receiving the modulated cover sequence as an RF carrier input; generating an RF output by modulating the modulated cover sequence with the altered version first the first signal and the altered version of the second signal; and providing path equalization delays to the altered version of the first signal and the altered version of the second signal, wherein the method exhibits 40 dB of carrier suppression.

8. The method of claim 7, wherein the first and second signals are in-phase data signal and a quadrature data signal respectively.

9. The method of claim 7, wherein modulating the altered version of the plurality of signals includes utilizing a quadrature phase shift keying (QPSK) modulator.

10. The method of claim 7, further comprising sending the RF output signal to an antenna.

* * * * *